April 19, 1949.    R. G. OLSON    2,467,627
DRIVING MECHANISM
Filed Jan. 17, 1948    2 Sheets-Sheet 1
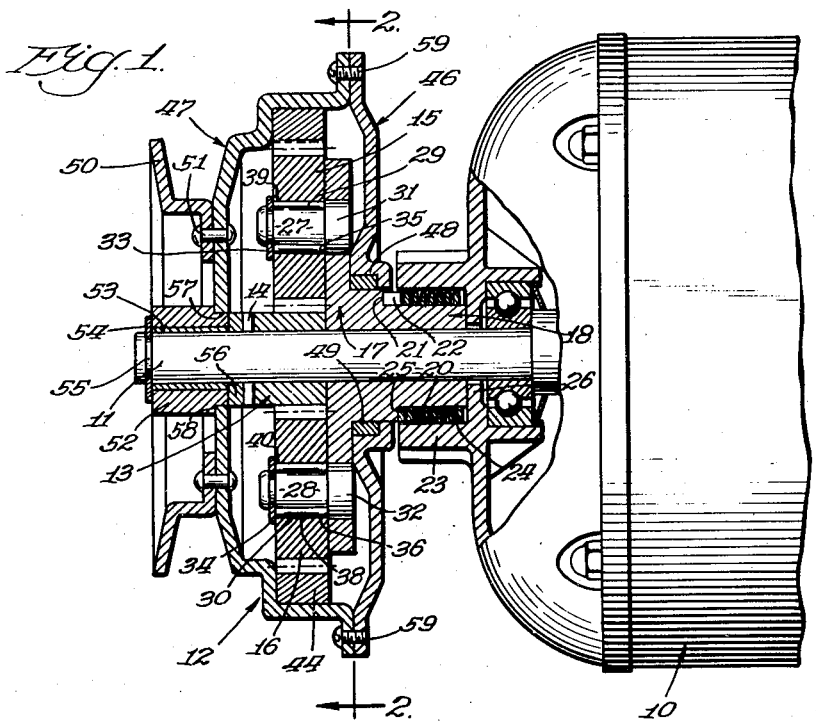
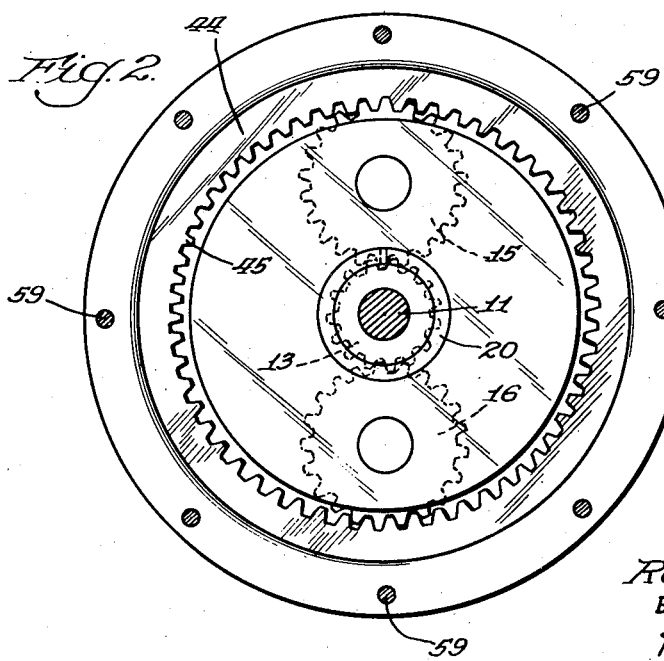
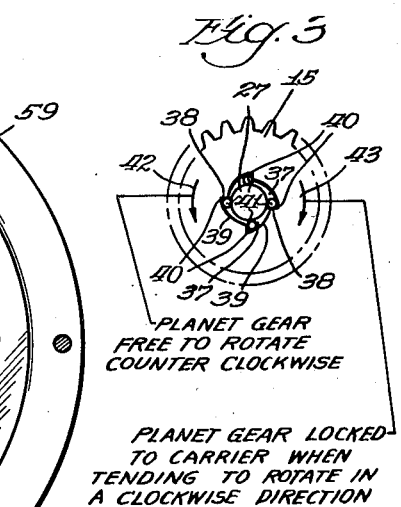
PLANET GEAR
FREE TO ROTATE
COUNTER CLOCKWISE
PLANET GEAR LOCKED
TO CARRIER WHEN
TENDING TO ROTATE IN
A CLOCKWISE DIRECTION
INVENTOR.
Raymond G. Olson
BY
Kenneth T. Snow
Atty.

April 19, 1949. R. G. OLSON 2,467,627
DRIVING MECHANISM
Filed Jan. 17, 1948 2 Sheets-Sheet 2

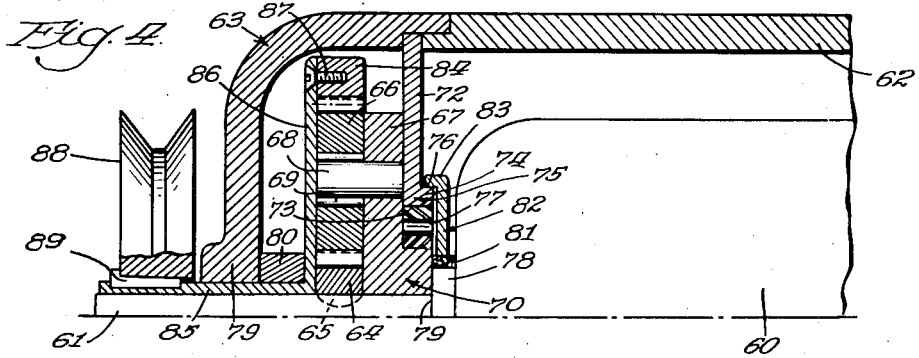

LOW SPEED OF FINAL DRIVE PULLEY.
MOTOR DRIVEN CLOCKWISE

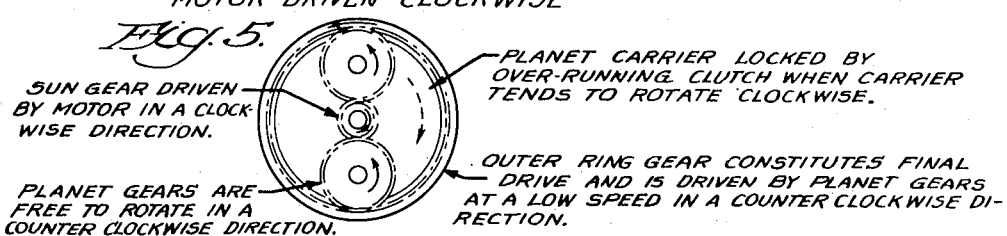

Fig. 5.

SUN GEAR DRIVEN BY MOTOR IN A CLOCKWISE DIRECTION.

PLANET CARRIER LOCKED BY OVER-RUNNING CLUTCH WHEN CARRIER TENDS TO ROTATE CLOCKWISE.

PLANET GEARS ARE FREE TO ROTATE IN A COUNTER CLOCKWISE DIRECTION.

OUTER RING GEAR CONSTITUTES FINAL DRIVE AND IS DRIVEN BY PLANET GEARS AT A LOW SPEED IN A COUNTER CLOCKWISE DIRECTION.

INTERMEDIATE STEP IN CHANGE-OVER.
FROM LOW SPEED TO HIGH SPEED
MOTOR STOPPED

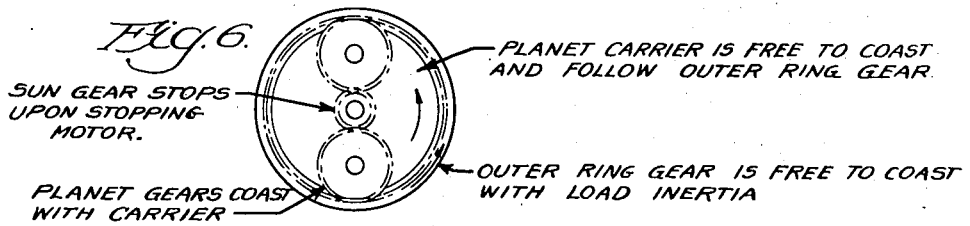

Fig. 6.

SUN GEAR STOPS UPON STOPPING MOTOR.

PLANET CARRIER IS FREE TO COAST AND FOLLOW OUTER RING GEAR.

PLANET GEARS COAST WITH CARRIER

OUTER RING GEAR IS FREE TO COAST WITH LOAD INERTIA

HIGH SPEED OF FINAL DRIVE PULLEY
MOTOR DRIVEN COUNTER CLOCKWISE

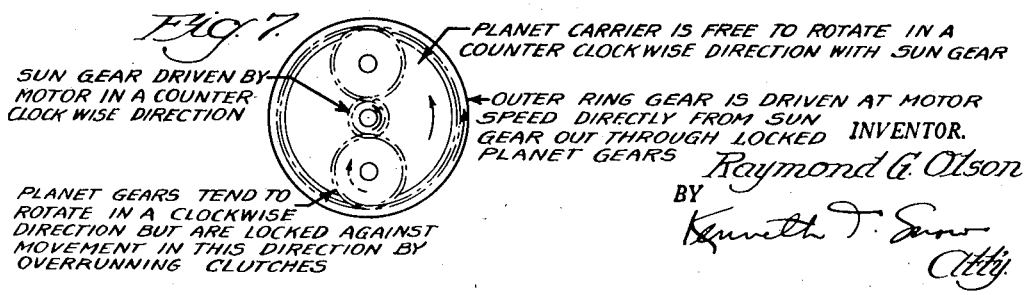

Fig. 7.

SUN GEAR DRIVEN BY MOTOR IN A COUNTER CLOCKWISE DIRECTION

PLANET CARRIER IS FREE TO ROTATE IN A COUNTER CLOCKWISE DIRECTION WITH SUN GEAR

OUTER RING GEAR IS DRIVEN AT MOTOR SPEED DIRECTLY FROM SUN GEAR OUT THROUGH LOCKED PLANET GEARS

PLANET GEARS TEND TO ROTATE IN A CLOCKWISE DIRECTION BUT ARE LOCKED AGAINST MOVEMENT IN THIS DIRECTION BY OVERRUNNING CLUTCHES

INVENTOR.
Raymond G. Olson
BY
Kenneth T. Snow
Atty.

Patented Apr. 19, 1949

2,467,627

UNITED STATES PATENT OFFICE 2,467,627

DRIVING MECHANISM

Raymond G. Olson, Niles, Ill., assignor of one-fourth to Kenneth T. Snow, Oak Park, Ill.

Application January 17, 1948, Serial No. 2,849

15 Claims. (Cl. 74—789)

This invention relates to a new and improved driving mechanism.

A principal object of this invention is the provision of means in a driving mechanism for effecting a two-speed final drive.

An important object of this invention is to provide means in a transmission for producing two different forward speeds upon driving of the transmission at the same speed both forwardly and reversely.

Another important object of this invention is the supplying of a mechanism which will convert the driving power of a reversible motor into two different forward speeds.

A further important object of this invention is to provide a planetary gearing transmission which is capable of producing two output speeds upon the admission of a single input speed.

A still further object of this invention is to provide means in a planetary gearing for causing certain of the component elements of said gearing to have separate rotation only in one direction for producing a two-speed transmission.

Another and still further object of this invention is the provision of a V-pulley directly associated with an outer ring gear of a planetary transmission gearing.

Still another object of this invention is to provide a single compact transmission which is readily adaptable for use in association with a reversible electric motor.

Still another object is to provide means for directly incorporating a two-speed planetary transmission with a motor thereby effecting a two-speed motor.

Another important object is the provision of a reversible motor with a planetary gearing built within an end bell housing of the motor and one way brake means arranged in the planetary gearing to produce a two-speed driver upon reversing the direction of rotation of the motor.

Another object of this invention is to provide a planetary gearing with a two-speed outer ring gear obtained by an input of equal speeds in an opposite rotational direction and means therein arranged to permit free wheeling or coasting of the outer ring gear when a driving motor is reversed to change to a higher speed of the outer ring gear, thus utilizing the inertia of the outer ring gear and driven members associated therewith to effect easy and quick change from low speed to high speed.

Other and further important objects of this invention will become apparent from the following specification and accompanying drawings.

In the drawings:

Fig. 1 is a side elevational view partially in section of the motor driven planetary transmission of this invention.

Fig. 2 is a sectional view taken on the line 2—2 of Fig. 1.

Fig. 3 is a detail front elevational view of one of the planet gears with a one way brake as used in this device.

Fig. 4 is a longitudinal sectional view of a modified form of the device showing the planetary gearing built within the end bell of the motor housing.

Figs. 5, 6, and 7 are diagrammatic views with numerous legends showing the activity of each of the planetary gearing elements.

Fig. 5 shows the device when the motor is driven clockwise and constructed and arranged to produce a low speed final drive.

Fig. 6 shows the device when the motor is stopped intermediate the change from low to high speed final drive.

Fig. 7 shows the device when the motor is driven in the opposite direction to that shown in Fig. 5 and in this case counterclockwise to produce a high speed final drive.

As shown in the drawings:

The reference numeral 10 indicates generally an electric motor and housing of the reversible type having a driven shaft 11 capable of clockwise and counterclockwise rotation.

A transmission 12 is carried on and operated by said motor driven shaft 11. The transmission is in the form of an epicyclic or planetary gearing consisting of a spur sun gear 13 pinned or otherwise fastened to the shaft 11 as shown at 14. The sun gear 13 thus rotates with the shaft 11 regardless of which direction the shaft is rotated.

Planet spur gears 15 and 16 are spaced equidistant around and in meshing engagement with the sun gear 13. The planet gears are supported on a spider or carrier 17 which has a laterally extending hub 18 journally supported on the shaft 11. Placed around the hub 18 is a helically coiled spring 20. A notch 21 in the hub 18 forms an abutment against which an end extension 22 of the spring 20 contacts. As the carrier 17 rotates the spring 20 is also rotated. A sleeve 23 surrounds the spring 20 and extends substantially the full length thereof from an integral attachment to the motor housing 10. A recess 24 is thus formed between the hub 18 and the inner surface of the sleeve extension 23. The spring 20 constitutes a one way brake when arranged in the manner described. The limited length of the recess 24 causes a slight compression of the spring 20. A shoulder 25 in the hub 18 defines the end of the recess 24 at one end and the other end of the recess is enclosed by an inwardly extending flange 26 of the sleeve 23. The motor with its integral housing flange 26 and the outwardly extending sleeve 23 constitutes a fixed support against which the driving of the transmission may react. The carrier 17 is permitted rotation separate from the motor support when movement is in a direction tending to wind the several convolutions of the spring. The slight friction of the spring abutting the wall 26 is overcome and the end of the spring just slides over this wall abutment. The diameter of the spring in its normal position is substantially the same diameter as that of the recess 24 with just sufficient clearance so that there is no tendency of the carrier hub to lock to the sleeve 23 as long as rotational movement of the hub is in a spring winding direction. Movement of or attempted movement of the carrier 17 in an opposite direction tends to cause the spring to unwind and thus expand radially along the length thereof. This expansion causes the spring to grip the inner wall of the sleeve 23 and rotation separate from the motor support is thus prevented. There are several types of automatically operable overrunning or free wheeling brakes which could be employed in this position and the showing of the spring type should not limit this device to the use of only overrunning spring brakes. Spring brakes are desirable in this position because of the limited space.

The carrier 17 is equipped with planet pins or shafts 27 and 28 over which the central bores 29 and 30 of the planet gears 15 and 16 are journally mounted. Overrunning brakes positioned intermediate the planet gears and the carrier pins limit separate rotation of the planet gears on the pins 27 and 28 only when the gears are rotating in one direction and that direction being the same as the direction of rotation permitted the carrier 17. In this case the carrier and the pins become the support against which the overrunning or one way brakes react and prevent separate rotational movement. The pins 27 and 28 are equipped with enlarged heads 31 and 32 respectively which are fixedly held in the carrier 17. Large diameter washers 33 and 34 are secured to the outer ends of the pins 27 and 28 and hold the planet gears against annular shoulders 35 and 36 formed by the enlarged pin heads 31 and 32.

The centrally located cylindrical passages or bores 29 and 30 of the planet gears are each equipped with a plurality of inclined notches 37 positioned around the internal annular periphery thereof. As best shown in Fig. 3 the short notches 37 are defined by radially extending end walls 38 and are arcuately tapered from points 39 on the circumference of the internal gear bore 29 to deep end portions 40 adjacent the radial end walls 38. Rollers 41 are adapted to ride in each of the tapered arcuate notches 37. As the planet gears 15 and 16 rotate in the direction indicated by the arrow 42, the rollers 41 rest in the deep ends 40 of the notches against the end walls 38 and do not in any manner hinder free rotation. Rotation or attempted rotation of the planet gears 15 and 16 in the opposite direction as indicated by the arrow 43 is blocked by reason of the rollers 41 moving upwardly in the tapered notches and being pressed against the outer peripheries of the carrier pins 27 and 28. Thus as the rollers are urged into the restricted shallow ends 39 of the arcuate notches the planets become fixed to the carrier 17. A different type of overrunning brake has been shown for the planet gears to indicate that the type employed is not essential to the success of this invention. It should be understood that any type of one way brake may be employed in any of the places such brakes are used. The brakes or overruning means employed in locking the planet gears from rotation result in a locking of the entire planetary transmission so that the component parts thereof rotate as a unit.

An outer ring gear 44 having internal teeth 45 meshes with the planet gears 15 and 16 and thus receives rotational driving through the planet gears. The ring gear thus constitutes the final drive for the transmission. The ring gear has and forms a unitary part of oppositely directed laterally and inwardly extending housing walls 46 and 47. The wall 46 has a hub portion 48 at its inner end which is journally mounted on the planet carrier hub over a bearing bushing 49. The other housing wall 47 extends in the opposite lateral direction and is inclined outwardly and radially inwardly. The inclined wall 47 forms one-half of a V-shaped pulley. The complemental pulley wall is formed by the member 50 riveted or otherwise attached to the wall 47 at 51. A sleeve hub 52 is journally mounted on the motor driven shaft 11 through a sleeve bearing 53. An end thrust washer 54 positioned in an annular groove 55 in the shaft 11 holds the V-pulley hub in position on the shaft 11 abutting a laterally extending hub 56 of the sun gear 13. The wall 47 has a centrally positioned opening 57 press fitted on the hub 52 and abuts an annular shoulder 58 formed in the outer periphery of the hub. The housing wall members 46 and 47 are joined together at their outer peripheries by screws or the like 59. All the moving elements of the planetary transmission are thus enclosed in the housing 46—47 and thus by removing the screws 59 and lock collar 54 access may be had to the planetary gearing. The housing and the integral V-pulley rotate as the final drive simultaneously with the driving of the ring gear 44. The transmission is entirely contained on the motor driven shaft and the motor housing forms all the stationary support required.

A modified embodiment of the invention is shown in Fig. 4. An electric motor includes an armature 60 with an integral shaft 61 journally mounted with a main motor housing 62 and an end bell housing 63. In this modification the planetary gearing is fully contained within the end bell housing thus dispensing with a separate housing as described for the device of Figs. 1 and 2. The devices of Figs. 1 and 4 function in the same manner. A sun gear 64 is fastened to the shaft 61 by means of a key 65. Planet gears 66 revolve about the sun gear 64 and are held in fixed spaced relationship by means of a planet gear carrier 67. Pins 68 join the planets to the carrier 67. Overrunning brakes 69 are positioned between the planet gears and the carrier and arranged to permit only separate rotation of the planet gears when they are rotating in one direction.

The carrier 67 is provided with an inner hub 70. The hub has a lateral extension 71. The hub and integral extension are journally mounted for separate rotation on the "live" driven motor shaft 61. A partition 72 is clamped between the main motor housing 62 and the end bell 63 and thus forms a rigid part of the motor housing. The partition 72 is disc shaped and separates the armature portion of the electric motor from the planetary gearing as well as constituting a support for carrying the reactive load of the gearing. The partition has a central aperture 73 with an annular lateral extension 74 of the partition adjacent the aperture and forming a hub 75 and a shoulder 76 over the lateral extension 74. The hub 75 of the partition is in radial alignment with the lateral extension 71 of the carrier 67. An overrunning or one way brake 77 is positioned intermediate the carrier 67 and the partition support 72. This brake permits rotation of the carrier in one direction but prevents rotation in the opposite direction as the brake acts to lock the carrier to the support.

The motor shaft 61 is provided with an annular flange 78 which forms a shoulder 79 against which the extension 71 of the carrier hub 70 abuts. This abutment prevents lateral movement of the gearing in an inward direction toward the armature 60. Movement in the other outer direction is prevented by the hub portion 79 of the end bell 63 and the spacer collar 80. A felt seal or washer 81 surrounds the flange 78 and cooperates with an oil seal member 82 to complete the separation of the motor armature chamber and the planetary gearing chamber within the end bell 63. The oil seal 82 has an outwardly bent flange 83 which clamps tightly over the annular shoulder 76 of the partition 72. The partitioning of the planetary gearing from the electrical parts of the motor permits proper lubricating of the gearing without injury to the motor.

An outer ring gear 84 surrounds and is driven by the planet gears 66. A sleeve 85 concentric with the shaft 61 is journaled on the shaft and extends laterally outwardly through the central opening of the end bell housing 63 defined by the hub 79. The sleeve 85 has an integral radially outwardly extending disc 86 which is bolted to the outer ring gear 84 at 87. The disc 86 forms a surface against which the sun and planet gears may rotate without interconnection. As the ring gear is driven the disc 86 and shaft sleeve 85 are also driven. A V-pulley 88 is fastened to the sleeve 85 by means of a taper key 89 which further locks the pulley against separate endwise movement on the sleeve 85. Thus the V-pulley takes the final drive of the outer ring gear 84.

It is believed that the operation of the device may better be described by viewing Figs. 5, 6, and 7 of the drawings. First it should be understood that the electric motor or any other motor used must be reversible and that the mechanism may be arranged to drive the outer ring gear in either low or high speeds regardless of which direction of rotation the motor is driven. However, after the overrunning brakes have been set to permit operation in a particular direction, low and high speeds of the ring gear will correspond to a fixed direction of rotation of the motor.

Let us review epicyclic gearing and determine the direction of rotation of each of the component elements when the sun gear is the driven member. Disregarding our overrunning brakes, when the sun gear is driven in a clockwise direction as viewed in any of Figs. 2, 5, 6, and 7, the planet gears will rotate in a counterclockwise direction, the planet gear carrier will rotate in a clockwise direction, and the outer ring gear will rotate in a counterclockwise direction. With the above as a proved premise we shall assume for example that our motor shaft will be driven in a clockwise direction to obtain a low speed drive for the outer ring gear in a countercockwise direction. This is shown in Fig. 5 and it is believed the legends clearly depict how the device functions. The planet gears are free to rotate counterclockwise and the carrier which tends to rotate clockwise similarly to the sun gear is locked from such movement by the functioning of its overrunning brake which prohibits rotation in a clockwise direction separate from the motor support. The outer ring gear and thus the final drive are driven at a greatly reduced rate of speed through the revolving planets.

Now to bring the outer ring gear up to the speed of the motor the motor is stopped during which time (see Fig. 6 with legends) the sun gear is stopped and the planet gears and the carrier are free to coast with the outer ring gear. The inertia of the ring gear and the V-pulley and driven elements maintain movement in a counterclockwise direction without hindrance from any of the overrunning brakes.

Fig. 7 then shows the reversal of motor drive to a counterclockwise direction and as the planet gears tend to turn clockwise they are locked against rotation by their respective overrunning brakes. Now however the planet carrier is free to rotate counterclockwise and the motor easily picks up the already moving carrier as it began its counterclockwise direction of rotation when the motor was stopped. As the planet gears are locked the sun gear drives directly out to the outer ring gear with the full speed of the motor in a counterclockwise direction. The outer ring gear is thus driven at two speeds in the same direction merely by reversing a constant speed motor.

There are many applications where this two-speed transmission will prove to be very valuable. The electric motor can easily have its direction of rotation reversed and thus the V-pulley can assume a motor speed without having to overcome the usual high initial torque load as the outer ring gear remains rotating in the same direction throughout the change in direction of rotation of the sun gear.

Numerous details of construction may be varied throughout a wide range without departing from the principles disclosed herein, and I therefore do not propose limiting the patent granted hereon otherwise than as necessitated by the appended claims.

What is claimed is:

1. In a two-speed planetary transmission comprising a sun gear adapted to be rotatably driven, planet gears spaced around said sun gear and in meshing relationship therewith, a planet gear carrier, individual overrunning brake means carrying each of said planet gears and said planet gear carrier, and an outer ring gear surrounding said planet gears and in meshing relationship therewith, whereby when the sun gear is driven in one direction the outer ring gear is driven at a reduced speed and opposite from that of the sun gear and when the sun gear is driven in a reverse direction the outer ring gear is driven at the same rate of speed and in the same direction as the sun gear.

2. In a planetary transmission comprising a support, an input shaft carried by said support and capable of being rotatably driven in either direction, a sun gear fixed to said input shaft, a spider planet carrier having a hub portion, said hub mounted over said input shaft, an overrunning brake positioned intermediate said hub and said support, planet gears rotatably mounted on said spider planet carrier, overrunning brakes positioned intermediate the planet gears and the spider planet carrier, and an outer ring gear surrounding said planet gears, all of said overrunning brakes arranged and constructed to permit separate rotation only in one direction, whereby rotation of the input shaft in one direction with the spider planet carrier locked from rotation causes the ring gear to be driven in the opposite direction from the input shaft at a reduced speed, and rotation of the input shaft in the opposite direction causes the ring gear to be driven in the same direction at the same speed by reason of the planet gears being locked from rotation by the overrunning brakes positioned intermediate the planet gears and the spider planet carrier.

3. In a planetary transmission comprising a support, an input shaft carried by said support and capable of being rotatably driven in either direction, a sun gear fixed to said input shaft, a spider planet carrier having a hub portion, said hub mounted over said input shaft, an overrunning brake positioned intermediate said hub and said support, planet gears rotatably mounted on said spider planet carrier, overrunning brakes positioned intermediate the planet gears and the spider planet carrier, an outer ring gear surrounding said planet gears, all of said overrunning brakes arranged and constructed to permit separate rotation only in one direction, whereby rotation of the input shaft in one direction with the spider planet carrier locked from rotation causes the ring gear to be driven in the opposite direction from the input shaft at a reduced speed, and rotation of the input shaft in the opposite direction causes the ring gear to be driven in the same direction as the input shaft at the same speed by reason of the planet gears being locked from rotation by the overrunning brakes positioned intermediate the planet gears and the spider planet carrier, and a V-pulley joined to said ring gear whereby the rotational driving output of said planetary transmission is imparted to said V-pulley.

4. An epicyclic gearing including a support, a driven sun member, a planet carrier journaled on said support, overrunning brake means positioned intermediate the carrier and the support, planet members journaled on said planet carrier and driven by said sun member, overrunning brake means positioned intermediate each of the planet members and the planet carrier, and an outer ring member surrounding and driven by said planet members.

5. An epicyclic gearing including a support, a driven sun gear, a planet carrier journaled on said support, an overrunning brake positioned intermediate the carrier and the support, a planet gear journaled on said planet carrier, an overrunning brake positioned intermediate the planet gear and the carrier, and an outer ring gear driven by said planet gear.

6. An epicyclic gearing including a support, a driven sun gear, a planet carrier journaled on said support, an overrunning brake positioned intermediate the carrier and the support, planet gears journaled on said planet carrier, an overrunning brake positioned intermediate at least one of the planet gears and the carrier, and an outer ring gear driven by said planet gears, said overrunning brakes arranged and constructed to permit rotation in one direction and prevent rotation in the opposite direction whereby rotation of the sun gear at the same speed in opposite directions at different times results in two different speeds in the one direction at corresponding different times of the outer ring gear.

7. An epicycle gearing including a support, a driven sun gear, a planet carrier journaled on said support, an overrunning brake positioned intermediate the carrier and the support, planet gears journaled on said planet carrier, overrunning brakes positioned intermediate the planet gears and the carrier, an outer ring gear driven by said planet gears, said outer ring gear having attached thereto oppositely directed laterally and inwardly extending housing walls, said housing walls journally mounted with respect to said sun gear on either side thereof, and a V-pulley formed with one of said housing walls whereby drive of the outer ring gear drives the housing walls and the V-pulley.

8. In a driving mechanism comprising a reversible motor having a driven shaft, a sun gear fixed to said driven shaft, a planet carrier, means supporting said planet carrier on said motor, said means including an overrunning brake positioned intermediate said planet carrier and said motor, planet gears, means mounting said planet gears on said planet carrier, said last-named means including overrunning brakes, and an outer ring gear driven by said planet gears.

9. In a driving mechanism comprising a reversible motor having a driven shaft, a sun gear fixed to said driven shaft, a planet carrier, means supporting said planet carrier on said motor, said means including an overrunning brake positioned intermediate said planet carrier and said motor, planet gears, means mounting said planet gears on said planet carrier, said last-named means including overrunning brakes, and an outer ring gear driven by said planet gears, all of said overrunning brakes arranged and constructed to run in one direction and lock in the opposite direction, whereby operation of the motor and rotation of the motor driven shaft in one direction effects a driving of the outer ring gear at a reduced speed and in an opposite direction from that of the motor driven shaft, and operation of the motor and rotation of the motor driven shaft in the other direction effect a direct drive of the outer ring gear in the same direction as that of the motor driven shaft.

10. In a planetary gearing transmission comprising a support, a sun gear capable of being rotatably driven in either direction, planet gears engaging and driven by said sun gear, a planet gear carrier supporting said planet gears, overrunning brakes positioned intermediate said planet gears and said planet gear carrier, means for journally mounting said carrier with respect to said support, and an overrunning brake positioned intermediate said carrier and said support, said overrunning brakes arranged and constructed whereby rotation of the sun gear in one direction will cause an opposite rotation of the planet gears and the overrunning brakes of the planet gears permit free rotation of the planet gears in said opposite direction of rotation, and said overrunning brake of the planet gear carrier preventing rotation of the carrier in the direction of rotation of the sun gear and opposite to that of the planet gears for a final slow speed rotational drive of the outer ring gear, and whereby rotation of the sun gear in the other direction will cause a locking of the planet gear overrunning brakes and a releasing of the planet gear carrier overrunning brake for a final high speed drive in the same direction as the direction of final drive for the low speed drive of the outer ring gear and equal to the speed of the sun gear.

11. In a planetary transmission comprising a support, a sun gear capable of being driven in either direction, planet gears surrounding said sun gear and driven thereby, a planet gear carrier journaled on said support, an overrunning brake arranged between said carrier and said support, said planet gears journaled on said planet gear carrier, and overrunning brakes arranged between each of said planet gears and said planet gear carrier whereby when the sun gear is rotated in one direction the planet gears are permitted free rotation and the planet gear carrier is locked from rotation and when the sun gear is driven in the opposite direction the planet gears are locked from rotation and the planet gear carrier is permitted free rotation.

12. In a two-speed planetary transmission comprising a reversible electric motor, a housing for said motor, a shaft driven by said motor, a sun gear positioned on and driven by said motor driven shaft, a planet carrier journaled on said shaft, an overrunning brake arranged between said planet carrier and said motor housing, spaced planet gears journaled on and positioned around said planet carrier, an overrunning brake arranged between each of said planet gears and said planet carrier, and an outer ring gear surrounding and driven by said planet gears whereby driving of the motor in one direction will effect a low driving speed of the outer ring gear in the opposite direction and whereby driving of the motor in the opposite direction will effect a high driving speed of the outer ring gear in the same opposite direction.

13. In a two-speed planetary transmission comprising a reversible electric motor, a housing for said motor, a shaft driven by said motor, a sun gear positioned on and driven by said motor driven shaft, a planet carrier journaled on said shaft, an overrunning brake arranged between said planet carrier and said motor housing, spaced planet gears journaled on and positioned around said planet carrier, an overrunning brake arranged between each of said planet gears and said planet carrier, an outer ring gear surrounding and driven by said planet gears, a concentric sleeve journaled on said motor driven shaft, and means for joining said outer ring gear to said sleeve whereby final transmission drive of the outer ring gear is transmitted to the concentric sleeve.

14. In a combination reversible motor and two-speed planetary transmission comprising a motor, a motor housing, a shaft driven by said motor, a sun gear attached to said motor driven shaft, a planet carrier journally supported on said motor housing, an overrunning brake arranged to be actuated by said planet carrier and react against said motor housing, planet gears driven by said sun gear and journaled on said planet carrier, overrunning brakes arranged to be actuated by each of said planet gears and react against said planet carrier, and an outer ring gear surrounding and driven by said planet gears, said overrunning brake actuated by said planet carrier adapted to actuate and lock the carrier against rotation when the motor shaft is driven in one direction, and said overrunning brakes actuated by said planet gears adapted to actuate and lock said planet gears against rotation when the motor shaft is driven in the other direction.

15. In a planetary transmission comprising a support, a sun gear capable of being driven in either direction, planet gears surrounding said sun gear and driven thereby, a planet gear carrier journalled on said support, an outer ring gear surrounding and driven by said planet gears, a first overrunning means positioned between said carrier and said support, a second overrunning means arranged and constructed with said planetary transmission to lock the component parts of said planetary transmission together for rotation as a unit, whereby when the sun gear is driven in a first direction the first overrunning means locks up to the support and the outer ring gear is driven at a reduced speed in a second or opposite direction free of action of the second overrunning means, and when the sun gear is driven in the opposite or second direction the first overrunning means releases and the second overrunning means locks up so the entire planetary transmission including the outer ring gear rotates as a unit at a faster speed in the second direction.

RAYMOND G. OLSON.

REFERENCES CITED

The following references are of record in the file of this patent:

UNITED STATES PATENTS

| Number | Name | Date |
|---|---|---|
| 479,177 | Vogel | July 19, 1892 |
| 692,658 | Head | Feb. 4, 1902 |
| 2,087,261 | Miller | July 20, 1937 |
| 2,263,625 | Gregg | Nov. 25, 1941 |
| 2,321,960 | Wearn | June 15, 1943 |
| 2,384,996 | Hanson | Sept. 18, 1945 |

FOREIGN PATENTS

| Number | Country | Date |
|---|---|---|
| 77,546 | Austria | Aug. 11, 1919 |